July 17, 1923.
F. W. FOUSE
SPIRIT LEVEL
Filed Jan. 28, 1919
1,462,231
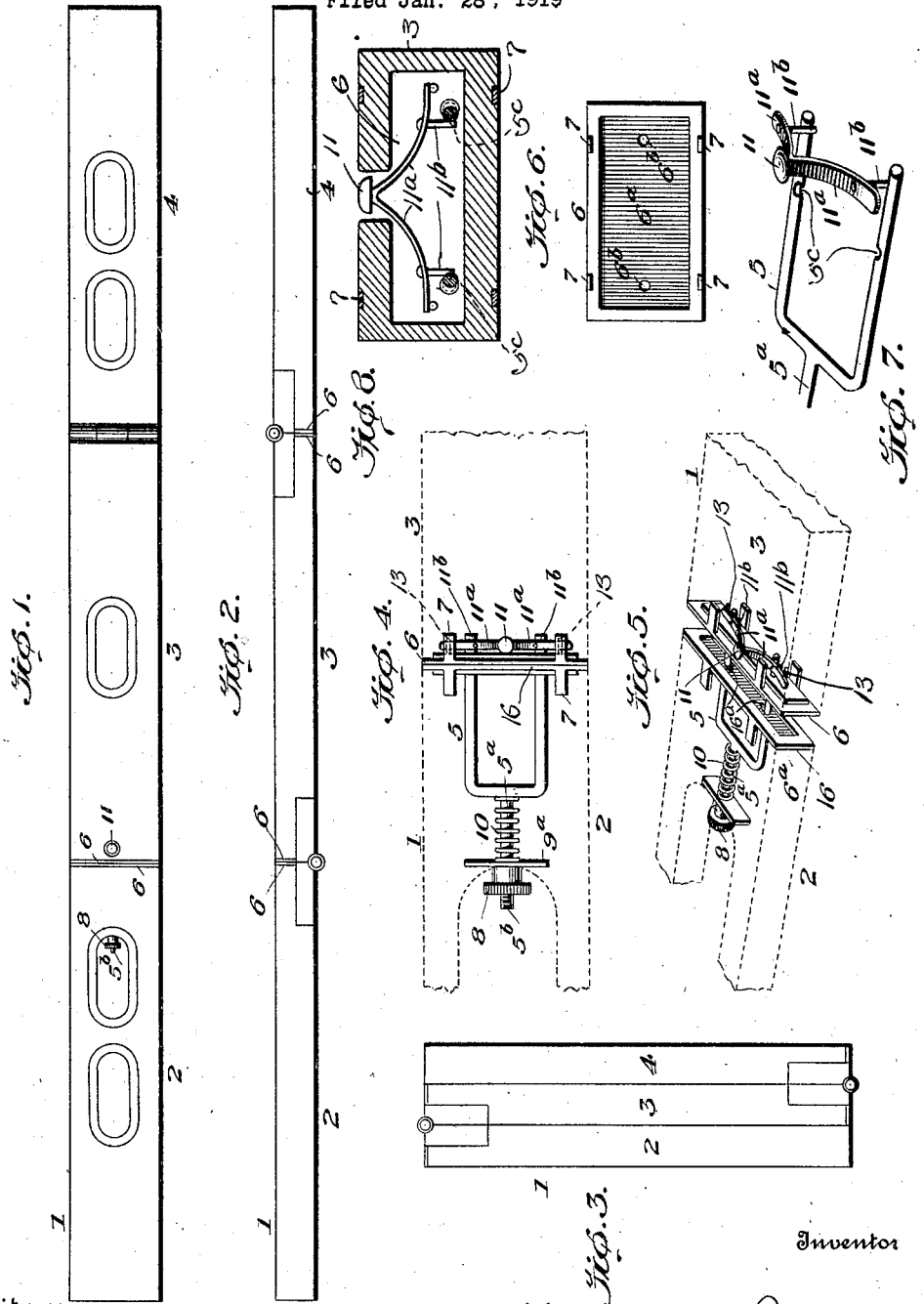

Patented July 17, 1923.

1,462,231

UNITED STATES PATENT OFFICE.

FREDERICK WILLIAM FOUSE, OF MUSKOGEE, OKLAHOMA.

SPIRIT LEVEL.

Application filed January 28, 1919. Serial No. 273,625.

*To all whom it may concern:*

Be it known that I, FREDERICK WILLIAM FOUSE, a citizen of the United States, residing at Muskogee, in the county of Muskogee and State of Oklahoma, have invented certain new and useful Improvements in Spirit Levels; and I do hereby declare the following to be a full, clear, and exact description of the invention, such as will enable others skilled in the art to which it appertains to make and use the same.

This invention relates to improvements in spirit-levels of the sectional or foldable type, and is adapted for plumbing walls, as for bricklayers' or masons' use, and for use by artisans or mechanics generally.

The invention has for its object facility and convenience in carrying the implement or device from place to place, as in a grip, sack or other container.

Also, further objects of the invention are to facilitate the placing of the foldable sections of the device in operative position, and to provide for their effective retention in such position.

Other objects of the invention will be apparent as the characteristics and advantages thereof are disclosed by the following description.

In the accompanying drawings is illustrated the preferred embodiment of my invention wherein it will be understood that various changes and modifications as to the details of construction and arrangement of parts may be made without departing from the spirit or scope of the invention, as covered by the claims.

In the drawings:

Figure 1 is a plan view of a spirit-level of general type, with my invention applied thereto;

Figure 2 is a side elevation thereof;

Figure 3 is a view showing the spirit level in folded condition;

Figure 4 is a plan view, upon a somewhat enlarged scale, of detail parts of the device with portions of the spirit-level shown in dotted lines;

Figure 5 is a detached perspective view showing the relation of the parts at the meeting ends of the sections with the hinge omitted;

Figure 6 is a detached face view of one of the plate members for facing the meeting ends of the spirit-level sections.

Figure 7 is a perspective detailed view of a part shown in Fig. 4;

Figure 8 is a transverse sectional view through one of the sections adjacent the ends and showing the back releasing means.

In the disclosures of my invention I preferably provide a spirit-level, designated generally as 1, and made in three articulated sections 2, 3, 4, and having means for retaining or holding the sections temporarily in fixed alignment, as practiced in using the device in connection with bricklaying or masonry work, the retaining means being housed in one of the abutting or meeting ends of the sections or members 2 and 3 of the device.

This retaining means is preferably a U-shaped element 5 which, however, may be of other general form, adapted for the purpose. Said element or member 5 is adapted to have slidable movement, and is positioned to allow the free ends of its arms to be projected beyond the end of the spirit level section, within which it is contained, and into the opposed end of the adjacent spirit level section which is adapted to receive said free ends.

The opposed ends of these sections are faced with reinforcing plates 6 conforming to the general end outline of said sections or ends. These plates are cast or formed integrally at their margins with lugs 7, outstanding therefrom at right angles, and adapted to enter recesses of the spirit level sections to thereby secure said plates in effective position upon the latter. Said plates may have their central portions $6^a$ sunken or depressed, the depressions forming protrusions on the opposite sides of said plates, which protrusions fit into the ends of the spirit level sections to aid in retaining the plates in position. These reinforcing plates are also provided with orifices, as at $6^b$, at points in alignment with the arms of the element 5, and provide for the passage of said arms through said element.

The element 5 has projecting from its central or arm-connecting portion a stem $5^a$, the outer free end of which is screw-threaded, as at $5^b$, for the reception of a nut 8 constituting an actuating handle for said element, said stem extending through a wear plate $9^a$. Upon the stem $5^a$ of the member 5 is positioned a spring 10 which exerts a thrusting pressure upon said member and therefore projects the free ends of said member into their engaging positions in orifices 6ᵇ.

A button or knob-equipped device 11, suitably positioned in a cavity at the end of one section of the spirit level adjacent to the end of the arm of the U-shaped member 5, as shown in Figs. 4 and 5, has two resilient or spring arm members 11ᵃ, carrying pins 11ᵇ which contact with the arms of the member 5 to slightly spread and release said arms when the device 11 is depressed, the arms of the element 5 having each a notch 5ᶜ to engage the edges of an orifice of the reinforcing plate 6. When the ends of the arms of element 5 are forced into the orifices 6ᵇ the notches 5ᶜ will engage with a part of the plate 6, so as to lock one section of the level to another. When the knob of the device 11 is depressed the spring arms 11ᵃ and their pins 11ᵇ will act to spread the arm of element 5 and disengage the notches 5ᶜ from the orifices 6ᵇ, so that one section of the level can be folded upon another section. The element 5 can be retracted against the pressure of spring 10 by means of the nut 8 on the screw-threaded stem 5ᵇ, and bearing on the plate 9ᵃ, which is fixed in a section of the level. By these means the sections of the spirit level will be securely held in perfect alignment.

Although I have illustrated the spirit level as having only one device for holding the parts thereof in alignment, it will be understood that other sections may be equipped in a similar manner, there being as many of such devices as there are hinged joints in the spirit level.

Having thus described my invention what I claim as new and desire to secure by Letters Patent is:

1. An articulated device comprising a plurality of hinged sections, one of which is provided with a U-shaped member presenting parallel rods having their extremities extending beyond the end and positioned and proportioned to enter orifices in the opposed section when the sections are extended and with lateral notches adapted to yieldingly engage the sides of the orifices in locking engagement, and means to manually separate the rods to disengage the same from locking engagement.

2. An articulated device comprising a plurality of hinged sections, one of which is provided with a slidably mounted U-shaped member having its extremities extending beyond the end of the section and proportioned and positioned to enter orifices in the opposed section, and provided with lateral notches adapted to yieldingly engage the sides of said orifices, means to exert manual stress upon said member to tighten said locking engagement and manual means to yieldingly actuate said rods to move them out of locking engagement.

3. An articulated device comprising a plurality of hinged sections, one of which is provided with rods having their extremities extending beyond the end of said section and proportioned and positioned to enter orifices in the opposed section, and having lateral notches adapted to lockingly engage the sides of said orifices, and a resilient member positioned to be manually actuated and to move the rods yieldingly out of such locking engagement.

4. An articulated device comprising a plurality of hinged sections, one of which is provided with a U-shaped member longitudinally slidable and having its extremities extending beyond the end of its section and in position to enter orifices formed in the end of the adjacent section and having lateral notches adapted to engage yieldingly the sides of said orifices, means to exert manual stress upon said U-shaped member to adjust said member longitudinally and to exert tightening stress upon said locking engagement, and manual actuating means for yieldingly separating said rods out of locking engagement with said orifices.

In testimony whereof, I affix my signature, in presence of witnesses.

FREDERICK WILLIAM FOUSE.

Witnesses:
    DAVID A. KLINE,
    A. A. AVERY,
    HOMER BAUGHMAN.